Oct. 4, 1960     E. D. WINKLER     2,955,273
ELECTRICAL CONNECTOR
Filed Feb. 11, 1957

INVENTOR.
Edward D. Winkler
BY Robert R Churchill
ATTORNEY

United States Patent Office 2,955,273
Patented Oct. 4, 1960

2,955,273

ELECTRICAL CONNECTOR

Edward D. Winkler, Reading, Mass., assignor to Albert & J. M. Anderson Manufacturing Company, Boston, Mass., a corporation of Massachusetts Filed Feb. 11, 1957, Ser. No. 639,528

3 Claims. (Cl. 339—45)

This invention relates to an electrical connector.

The invention has for an object to provide a novel and improved electrical connector which is characterized by novel release mechanism for quickly and forcibly disengaging the connector from its connected element.

Another object of the invention is to provide a novel and improved electrical connector which is particularly adapted for use in supplying electrical power to an aircraft for starting the engine thereof and which may be forcibly released when the aircraft is ready for take off to thereby prevent accidents from occurring as a result of take off while the connector is in engagement with the aircraft.

With these general objects in view and such others as may hereinafter appear, the present invention consists in the novel and improved electrical connector and in the structure thereof hereinafter described and particularly defined in the claims at the end of this specification.

In the drawings illustrating the preferred embodiment of the invention:

Figure 1:
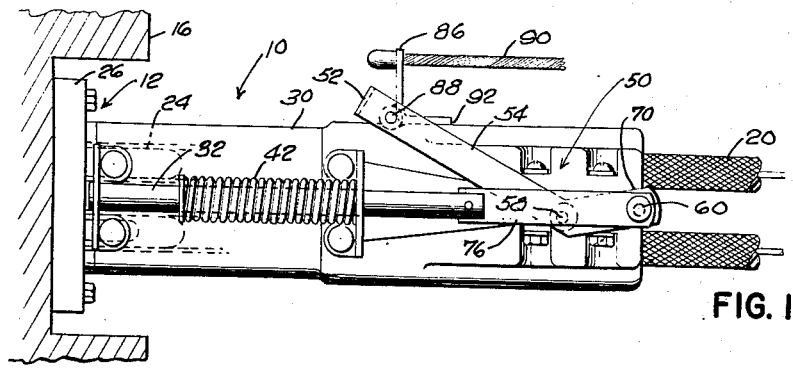
Fig. 1 is a side elevation of the connector embodying the present release mechanism shown in a spring loaded position and engaged with the contact elements of an aircraft.
Figure 2:
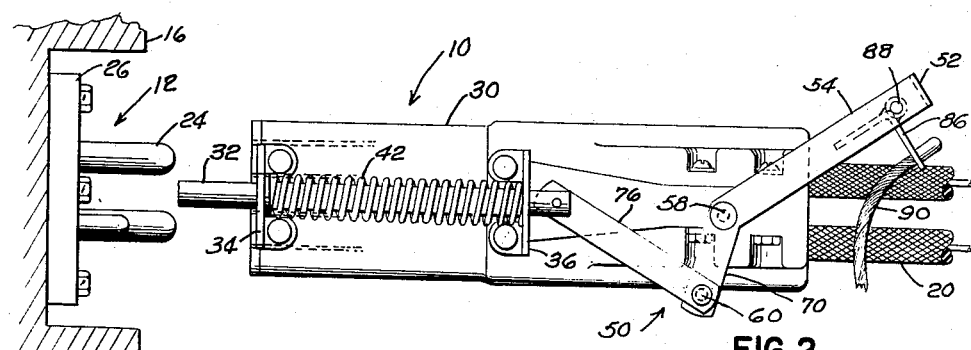
Fig. 2 is a side elevation of the connector showing the release mechanism in its released position and the connector disengaged from the aircraft contacts.
Figure 3:
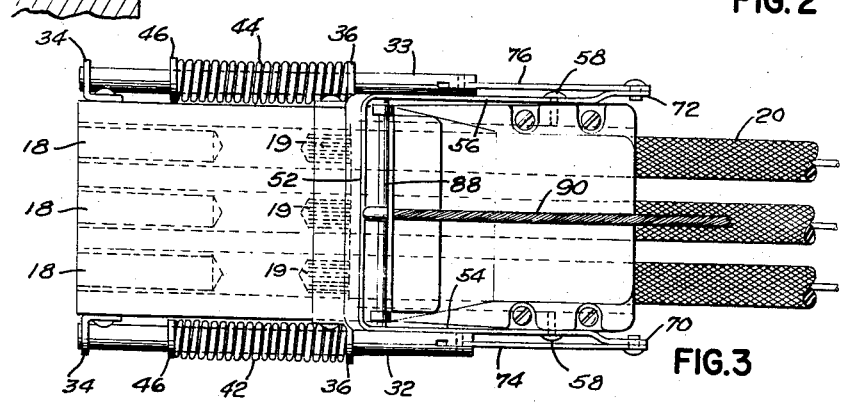
Fig. 3 is a plan view of the present electrical connector.
Figure 4:
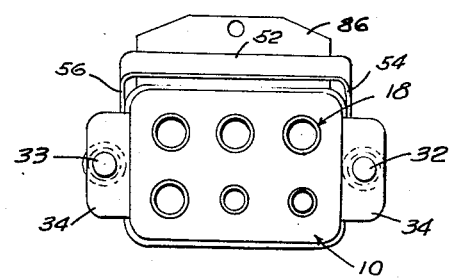
Fig. 4 is an end view of the same.

In general the present invention contemplates a novel and improved electrical connector particularly adapted for use in supplying electrical power from a portable source, such as a mobile generator, to aircraft, particularly jet aircraft, in order to start the engines thereof.

The invention contemplates a connector which may be quickly and automatically disconnected from an airplane whenever the engine is started and which is particularly adapted for use with jet aircraft wherein fuel consumption and personnel safety are of the utmost importance. Prior connectors of which I am aware are not entirely satisfactory for use in connection with this type of aircraft since in order to disconnect such types of prior connectors maintenance personnel necessarily have to walk under the fuselage of the plane and often pass into the path of the air intake or of the hot exhaust gases of the plane and frequently become seriously injured. On many occasions aircraft have started to take off with the connector still connected thereto. This, of course, has resulted in broken cables, generators and connectors, and in some cases severe damage to the aircraft itself. In accordance with the present invention the present electrical connector is provided with novel means carried by the connector for effecting quick release and disengagement of the connector from the aircraft contacts, such release being triggered either manually or by the initial strain of take off of the aircraft, enabling the aircraft to take off rapidly and substantially eliminating injury to personnel heretofore prevalent in prior connectors.

The present electrical connector comprises an insulated contact unit having a plurality of contact members, herein shown as female contact members connected to cables from a source of power, such as a generator, the illustrated connector being adapted for engagement with a male contact unit mounted in fixed relation to the aircraft and which forms the terminal for the ignition system thereof. The present release mechanism is operative to effect forcible release of the connector from engagement with the male contact unit upon the application of tension to the triggering element thereof.

Referring now to the drawings illustrating the preferred embodiment of the present invention, 10 represents the present insulated electrical connector adapted for engagement with a contact unit 12 forming a part of the ignition system of an airplane and mounted in fixed position in the fuselage 16 of the airplane. The insulating body of the connector 10 preferably comprises rubber having openings extending therethrough in which the female contact members 18 are supported, the contacts 18 being connected, as at 19, to the cables 20 also extended through the openings and which lead from the source of electrical supply. The female contact members 18 are arranged to be engaged with the male contact unit 12 to thereby connect the ignition system of the airplane to the source of electricity in order to supply the necessary electrical power to start the airplane engine.

The contact unit 12 may be of the conventional six-pole type having male contacts 24 mounted in an insulating board 26. In accordance with the usual practice the contact unit 12 is preferably mounted within a well or recess in the fuselage of the aircraft which may be covered with a removable cap member (not shown) which is arranged to be opened or removed to enable the connector 10 to be engaged therewith as shown in Fig. 1. It will be understood that in practice the contacts 18 and 24 are in tight frictional engagement to provide a firm electrical connection and that considerable force is required to disengage the connector.

In accordance with the present invention the detachable connector 10 is provided with novel release mechanism for quickly and forcibly releasing and disengaging the connector 10 from the contact unit 12. As herein shown, the rubber body of the connector is provided with an outer sheath member 30 which is preferably of metal and may be molded integrally with the contact end of the connector, the sheath member providing support for the release mechanism. The release mechanism includes a pair of pusher rods 32, 33 slidably mounted one on each side of the connector in openings provided in angle brackets 34, 36 attached to the sheath member 30 as shown. Coil springs 42, 44 are mounted one on each rod 32, 33 and disposed between the inner brackets 36 and collars or rings 46 secured to their respective rods whereby to enable the springs to be compressed upon rearward movement of the rods and to expand and urge the rods forward when the springs are released. As herein shown, in order to retract and latch the rods 32, 33 in their retracted position, toggle linkage 50 is provided. Toggle linkage 50 includes an operating handle having a cross bar 52 and integral side arms 54, 56 pivotally mounted at 58 in the sheath member, one arm on each side of the connector 10. Angular extensions 70, 72 of the arms are connected by links 74, 76 to the ends of rods 32, 33 by pin and slot connections as shown.

In operation whenever it is desired to retract the rods 32, 33 to a position flush with the front face of the connector 10, the handle 52 is rocked forwardly toward the contact end of the connector. In this manner the rods 32, 33 through toggle linkage 50, are retracted toward the cable end of the plug 10 and the springs 42, 44 are compressed to place the rods in a spring loaded position. It will be observed that in its spring loaded position, as shown in Fig. 1, the pivotal connections 60 between the arm extensions 70, 72 and the links 74, 76 are disposed over the dead center on one side of a line passing through the longitudinal axes of the rods 32, 33 to lock or latch the rods in their retracted position. Rearward rocking movement of handle 52, through linkage 50, rocks the pivotal connections 60 over the other side of dead center to thus release the springs 42, 44, and in this manner rods 32, 33 are urged by the springs to a forwardly extended position beyond the front face of plug 10 to thus exert a pushing force effecting disengagement of the connector 10 from the contact unit 12.

In practice substantial force is required to break the toggle and release the toggle linkage, and as herein shown, in order to provide additional leverage or mechanical advantage to lessen the force required, an angle member 86 comprising the triggering element is secured to a rod 88 extended between and pivotally mounted in the arms 54, 56 of the handle. A lanyard 90 is secured to the upstanding leg of the angle member, the other leg bearing against the adjacent side wall of the connector. In operation when the lanyard is pulled to the right, viewing Fig. 1, the angle member 86 will be rocked clockwise on a pivot defined by the end of the horizontal leg, as indicated at 92, engaging the side wall of the connector. Thus, the rod 88 and handle 52 will be rocked clockwise to effect triggering of the toggle and release of the spring urged rods 32, 33 which effect a pushing force against the face of the contact unit 12 to disengage the connector 10 therefrom.

In operation the present electrical connector is utilized to connect a source of electrical power, such as a mobile generator, to the ignition system of an aircraft in order to assist in starting the engine. The release mechanism is moved to its spring loaded position as illustrated in Fig. 1. In this position the forward ends of the rods 32, 33 are in alignment with or slightly below the face of the contact end of the connector and the handle 52 assumes a forwardly rocked position as shown in Fig. 1. The connector 10 may then be engaged with the contact unit 12 of the aircraft, thus connecting the electrical power from the mobile generator through the cables 20 to the ignition system of the aircraft. The lanyard 90 which is secured to the angle member 86 of the operating handle of the release mechanism may be secured at its other end to the generator or may be, if desired, secured to the cable 20 from such generator. The lanyard is of shorter length than the cable in order that any strain placed upon the connector and cable is taken up by the lanyard. In accordance with the present invention, as soon as a substantial amount of tension is applied to the lanyard 90, the operating handle 52 is rocked rearwardly and the springs 42, 44 are permitted to expand, causing the forward ends of the rods to extend and to press against the face of the contact unit 12, thereby urging the connector away from the contact unit and quickly and forcibly disengaging the contacts. The plane may then be moved for take off without any danger of having the connector attached thereto. It will be apparent that the present invention enables the connector to be rapidly and easily disengaged from the plane by maintenance personnel who are able to remain at a safe distance from the fuselage of the plane and in this manner many serious injuries to such personnel are avoided.

While the lanyard may be secured to a fixed object and thereby cause the movement of the aircraft to actuate the release mechanism, the lanyard is preferably manually pulled to effect immediate disengagement of the connector upon starting of the engine and before take off of the aircraft.

It will be observed that the present electrical connector cannot be connected to the contact unit of the aircraft unless the release mechanism is in a retracted and locked position, since in their extended position the ends of the rods will engage the face of the contact unit, thereby preventing engagement of the contacts. In this manner the engaged connector 10 is always ready to be disengaged by the present novel release mechanism. It will also be observed that the toggle linkage itself provides substantial leverage to effect withdrawal of the connector even without the ejecting springs 42, 44 so as to facilitate withdrawal in the event of spring failure.

While the preferred embodiment of the invention has been herein illustrated and described, it will be understood that the invention may be embodied in other forms within the scope of the following claims.

Having thus described the invention, what is claimed is:

1. A device of the character described comprising an electrical connector, and means carried by said connector for disengaging the same from a cooperating relatively stationary contact unit, said disengaging means including a pair of projectable spring loaded rods, and operating means comprising toggle linkage directly connected to said rods for retaining the rods in a retracted and spring loaded position with the outer ends thereof substantially in alignment with the contact end of the connector, said toggle linkage having a manually-operable handle pivotally mounted on said connector and arranged to be rocked in one direction to operate the toggle to retract said rods and effect spring loading and locking of the rods in their retracted position, and in the other direction to break the toggle and release said spring loaded rods into engagement with the face of the cooperating contact unit to effect forcible withdrawal and disengagement of the connector from its cooperating contact unit.

2. A device of the character described comprising an electrical connector having a body portion, and means carried by and mounted exteriorly of said body portion for disengaging the connector from a cooperating relatively stationary contact unit, said disengaging means including a pair of projectable spring loaded rods, and operating means comprising toggle linkage for each rod including an arm pivotally mounted in said body portion and having an operating handle, and a link pivotally connecting each arm to the inner end of its rod, said handle arranged to be rocked in one direction to operate the toggle to retract said rods and effect spring loading and locking of the rods in their retracted position prior to and independently of engagement with the cooperating contact unit, and in the other direction to break the toggle and release said spring loaded rods into engagement with the face of the cooperating contact unit.

3. A device of the character described, comprising: an electrical connector, and means carried by said connector for disengaging the same from a cooperating relatively stationary contact unit, said disengaging means including a pair of projectable spring loaded rods, and operating means comprising toggle linkage directly connected to said rods for retaining the rods in a retracted and spring loaded position with the outer ends thereof substantially in alignment with the contact end of the connector, said toggle linkage having a manually-operable handle pivotally mounted on said connector and arranged to be rocked in one direction to operate the toggle to retract said rods and effect spring loading and locking of the rods in their retracted position, and in the other direction to break the toggle and release said spring loaded rods into engagement with the face of the cooperating contact unit to effect forcible withdrawal and disengagement of the connector from its cooperating contact unit, an angle member rockingly mounted on said handle, one leg of said angle member being engaged with a side wall of the connector, the other leg being provided with a lanyard, said angle member pivoting on said one leg upon applying tension to said lanyard to facilitate rocking of the handle and breaking of the toggle.

(References on following page)

References Cited in the file of this patent

UNITED STATES PATENTS

| | | |
|---|---|---|
| 967,681 | Sloan | Aug. 16, 1910 |
| 2,051,425 | Schlums | Aug. 18, 1936 |
| 2,111,118 | Lake | Mar. 15, 1938 |
| 2,157,364 | Van Dorn | May 9, 1939 |
| 2,158,385 | Schwien | May 16, 1939 |
| 2,394,618 | Kunasch | Feb. 12, 1946 |
| 2,427,390 | Dear | Sept. 16, 1947 |
| 2,456,548 | Weiner et al. | Dec. 14, 1948 |
| 2,571,046 | Maisey | Oct. 9, 1951 |
| 2,696,594 | Harrington et al. | Dec. 7, 1954 |
| 2,738,476 | Buquor | Mar. 13, 1956 |

FOREIGN PATENTS

| | | |
|---|---|---|
| 687,866 | Germany | Feb. 7, 1940 |

UNITED STATES PATENT OFFICE
CERTIFICATION OF CORRECTION

Patent No. 2,955,273                                  October 4, 1960

Edward D. Winkler

It is hereby certified that error appears in the above numbered patent requiring correction and that the said Letters Patent should read as corrected below.

Column 4, line 50, after "contact unit." insert the following claims:

3. An electrical connector as defined in claim 2 wherein the pivotal mounting for said handle is disposed to one side of a plane in which the axes of the rods are disposed.

4. An electrical connector as defined in claim 2 wherein the rods are slidingly supported in angle brackets secured to and extended from two opposed side walls of said connector.

column 4, line 51, for the claim now appearing in the patent as number "3" read -- 5 --; in the heading to the printed specification, line 7, for "3 Claims." read -- 5 Claims. --.

Signed and sealed this 23rd day of May 1961.

(SEAL)
Attest:

ERNEST W. SWIDER                           DAVID L. LADD

Attesting Officer                        Commissioner of Patents